United States Patent Office 3,437,442
Patented Apr. 8, 1969

3,437,442
PROCESS FOR THE BITHERMAL ISOTOPIC ENRICHMENT OF AMMONIA AND HYDROGEN WITH DEUTERIUM AND APPARATUS THEREFOR
Keith Roderick Poole, Didcot, England, assignor to United Kingdom Atomic Energy Authority, London, England
Filed Mar. 7, 1966, Ser. No. 532,392
Claims priority, application Great Britain, Mar. 10, 1965, 10,088/65, 52,537/65
Int. Cl. C01b 2/04; C01c 1/00
U.S. Cl. 23—193                10 Claims

ABSTRACT OF THE DISCLOSURE

A process for the bithermal isotopic enrichment of ammonia and hydrogen with deuterium, and apparatus therefor, is characterised by subjecting ammonia condensed from the hydrogen on cooling to a cracking process to give a mixture of nitrogen and hydrogen which is isotopically exchanged with ammonia in the cold exchange tower.

---

The present invention relates to the production of materials which have a deuterium content in excess of the natural deuterium content and is particularly concerned with the dual temperature ammonia-hydrogen process for the production of deuterium enriched materials.

The product of most deuterium enrichment processes is heavy water or deuterium oxide. As is well known, heavy water acts as a moderator and slows down fast neutrons produced by nuclear fission. Many reactor systems have been proposed using heavy water either as a moderator only or as a moderator and coolant.

Several methods of deuterium enrichment have been proposed and each of these has been studied extensively in an endeavour to produce heavy water at an economic price. Once such process is the dual-temperature ammonia-hydrogen process, which involves passing liquid ammonia under high pressure in turn through a cold and hot tower in countercurrent to a stream of gaseous hydrogen passing from the hot tower to the cold tower. The temperature of the cold tower may be —70° C. and that of the hot tower 20° C. and the whole process is effected at a high pressure, for example 240 atmospheres. The liquid ammonia stream very desirably contains a catalyst to increase the rate of reaction, the catalyst presently preferred being potassium amide ($KNH_2$). An appreciable improvement of catalyst performance may be obtained by the addition of primary or secondary amines to the ammonia as described in British Patent No. 896,269.

Within both towers, isotopic exchange occurs between the liquid and gaseous streams. In the hot tower the conditions favour the passage of deuterium from the ammonia to the hydrogen stream which is then passed from the hot to the cold tower enriched in deuterium. In the cold tower conditions are such that the passage of deuterium from the hydrogen to the ammonia occurs and an enriched ammonia stream is thus passed from the cold to the hot tower. Thus, both streams between the towers are enriched in deuterium and an enriched produce may be withdrawn from either stream between the two towers.

Either of the two streams, having been passed through both towers may be recycled to the first tower through which they were passed, for example, the hydrogen stream would be recycled by returning the gas stream from the cold tower to the hot tower. With such a recycle the stream forms a closed circuit, the recycle section of which contains a material depleted in deuterium.

Since a product having an increased deuterium content is withdrawn from the system, it is necessary to continually restore the deuterium content of the system. If both streams form a closed circuit, then the recycle portion of such closed circuit may, for example, be passed into contact with a stream of water of natural deuterium content to replenish the stream. Alternatively, only one of the streams may form a closed circuit, at least part of the recycle portion of the other stream being continually withdrawn as waste and replenished by a stream having a natural deuterium content. Thus, the ammonia stream may form a closed system whilst part of the hydrogen stream is continually withdrawn as waste and replenished with hydrogen of natural deuterium content.

It is an object of the present invention to provide a new or improved variation on the dual temperature ammonia hydrogen process as hereinbefore described.

According to the present invention there is provided a process for the production of deuterium enriched materials which comprises a dual temperature ammonia-hydrogen exchange process in which a stream of hydrogen gas from the hot tower is cooled to the temperature of the cold tower prior to being passed to the cold tower, whereby ammonia vapour contained in said hydrogen stream is condensed, characterised in that such condensed ammonia is subjected to a cracking process to give a mixture of hydrogen and nitrogen, cooling such mixture and passing the cooled mixture in isotope exchange relationship with a stream of liquid ammonia in a cold exchange tower.

The ammonia vapour condensed from the hydrogen stream is heated and passed into an ammonia cracker in which it is decomposed to give a mixture of hydrogen and nitrogen in the molecular proportions of three to one, containing only a small proportion of ammonia. This mixture will hereinafter be termed "cracked ammonia."

According to a first embodiment of the present invention the cracked ammonia is mixed immediately with the cooled hydrogen stream from which it was condensed and passed into the cold exchange tower with the hydrogen.

In a second and preferred embodiment, however, a small bleed flow is taken from the enriched cold ammonia stream passing from the cold tower, and this enriched bleed is passed through a further cold tower in isotope exchange relationship with the cracked ammonia stream and thereby enriched still further. The cracked ammonia stream which passes from the further cold tower may then be mixed with the cold hydrogen stream and passed into the cold tower of the dual temperature system.

In either of these embodiments, the deuterium content of the cracked ammonia is greater than that of the cold hydrogen stream with which the cracked ammonia is mixed.

Hitherto, the ammonia condensed from the hydrogen stream by cooling the gas stream was returned to the ammonia stream passing from the cold to the hot tower. However, the deuterium content of the ammonia vapour is greater than that of the hydrogen forming the gas stream and thus condensation of the ammonia by cooling reduces the effective enrichment of the hydrogen stream. Using the described embodiments of the present invention, however, the addition of the cracked ammonia to the hydrogen stream passing into the cold tower results in a more highly enriched gas stream at this point than there would otherwise have been.

The potential increase in deuterium enrichment of the hydrogen stream entering the cold tower may be used either to give an increase in the deuterium content of the ammonia stream leaving the cold tower, using the same number of theoretical plates in the cold tower, or, using a smaller number of plates in the cold tower, the same degree of deuterium enrichment of the ammonia stream may be attained. Thus, using a cold tower having about 3⅓ theoretical plates, if the deuterium content of the incoming hydrogen stream is increased from about six times natural to about seven times natural, an increase in the deuterium content of the outgoing ammonia stream from about twenty-five times natural to about thirty times natural might be obtained. However, using a cold tower having only about 1⅓ theoretical plates, and a hydrogen feed stream having a deuterium content of about seven times natural, the deuterium content of the outgoing ammonia stream would still be about twenty-five times natural.

It will be appreciated that either of these variations lies within the scope of the present invention and the particular variation used will be merely a matter of choice governed by the economics of the variations and the nature of the desired product. However, the cold tower plates are inefficient since in this tower equilibrium is reached only slowly and thus, in the cold tower, a large number of actual plates are equivalent to one theoretical plate. Due to this, the cost of a cold tower of several theoretical plates is high and thus it may be preferred to use a cold tower having few theoretical plates to obtain a product having the same enrichment rather than to use the same cold tower to obtain a more enriched product.

Alternatively however, the cold tower could be of the same size and the size of the hot towers reduced. In such a case, the hydrogen gas stream entering the cold tower may in fact be of a lower deuterium content and still produce an outgoing liquid ammonia stream having a deuterium content of about twenty-five times natural. The reduced deuterium content of the hydrogen stream means that the degree of enrichment of the hydrogen stream in the hot tower is reduced and thus the size of the hot tower may be reduced.

Thus, the present invention may be used to obtain a more highly enriched ammonia stream from the cold tower, a smaller cold tower or a smaller hot tower. It will be appreciate that if the system was optimised, the resulting arrangement could include all the foregoing changes.

In either of the embodiments described, the cracked ammonia is conveniently cooled by passing it in heat-exchange relationship with the condensed ammonia being passed to the ammonia cracker, this also serving to heat the ammonia up to the required cracking reaction temperature.

The cracking of the ammonia may be effected using temperatures in the range 600–1000° C., and pressures of a few atmospheres. A catalyst of the type used for the ammonia synthesis reaction may be used. The cracking results in practically complete (usually about 99.5%) decomposition of the ammonia, the uncracked ammonia being conveniently used to saturate the cracked ammonia with ammonia vapour when the former is cooled to the temperature of the cold tower.

It will be appreciated that the quantity of ammonia to be cracked is only a small fraction of the circulating gases. Thus, one mole of hydrogen from the hot tower contains approximately 0.07 mole of ammonia vapour and essentially all of this ammonia is condensed on cooling to give 0.07 mole of ammonia for cracking. It will be realised that since the cracking of the ammonia results in a volume increase, mixing the cracked ammonia with the hydrogen passing into the cold tower results in the volume of gas fed into the cold tower being greater than that leaving the hot tower. This effect also may cause an increased deuterium content in the ammonia stream leaving the cold tower.

In the second preferred embodiment, the cracked ammonia from the further cold tower is passed to the cold hydrogen stream whilst the further enriched bleed of ammonia passing from the further cold tower may be passed to a finishing plant. Conveniently this finishing plant consists of a third cold exchange tower and a cracking stage, the major part of the ammonia stream being cracked and the cracked ammonia then passed in isotope exchange relationship with the remaining, minor, part of the ammonia stream in the third cold tower. By this means an ammonia stream may be obtained having a deuterium content of about 1,000 times natural.

It should be appreciated that the present invention also includes an apparatus for deuterium enrichment.

According to a further aspect of the present invention there is provided an apparatus for the production of a material enriched in deuterium isotope comprising a first isotope exchange tower provided with means to maintain said first tower at a low temperature, a second isotope exchange tower provided with means to maintain said second tower at a higher temperature than said first tower, a first conduit from said first tower to said second tower, heating means for said first conduit, a second conduit from said second tower to said first tower, cooling means for said second conduit, ammonia cracking means, a condensate conduit from said cooling means to the ammonia cracking means, cracked ammonia outlet means for said ammonia cracking means and means connecting said cracked ammonia outlet means to the second conduit at a point between the cooling means and the first tower.

The cracked ammonia outlet means may be connected to pass the hydrogen/nitrogen mixture directly to the second conduit in accordance with the first embodiment of the process of the present invention.

Preferably, however, the cracked ammonia outlet means is connected through a third isotope exchange tower and from thence to the second conduit. In such a case, a bleed conduit may pass from the first conduit to the third exchange tower. The third exchange tower may be provided with means whereby said third tower is maintained at about the same temperature as said first tower.

A conduit may be provided to carry ammonia from the third exchange tower to a finishing plant which conveniently comprises a further exchange tower which can be maintained at a low temperature as described in relation to the further processing of the further enriched bleed of ammonia.

It should be appreciated that the first and second towers are the cold and hot towers respectively of the duel temperature exchange apparatus, the first conduit carries liquid ammonia whilst gaseous hydrogen passes through the second conduit.

In order that the present invention may more readily be understood, two embodiments thereof will now be described by way of example, reference being made to the accompanying drawings, wherein.

Figure 2:
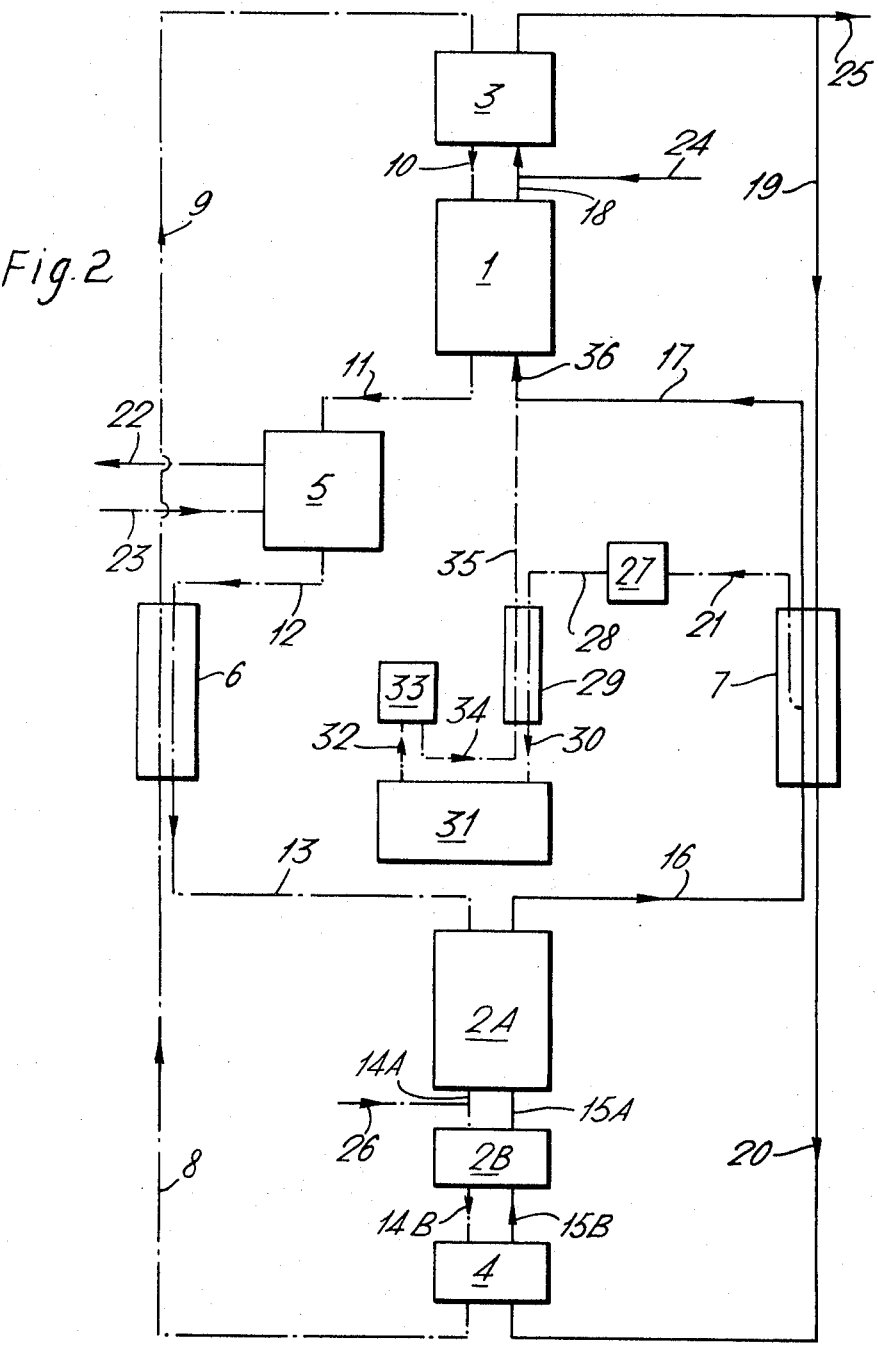
FIGURE 2 is a flow sheet for a process, in which the condensed ammonia is cracked and added directly to the circulating hydrogen stream.
Figure 3:
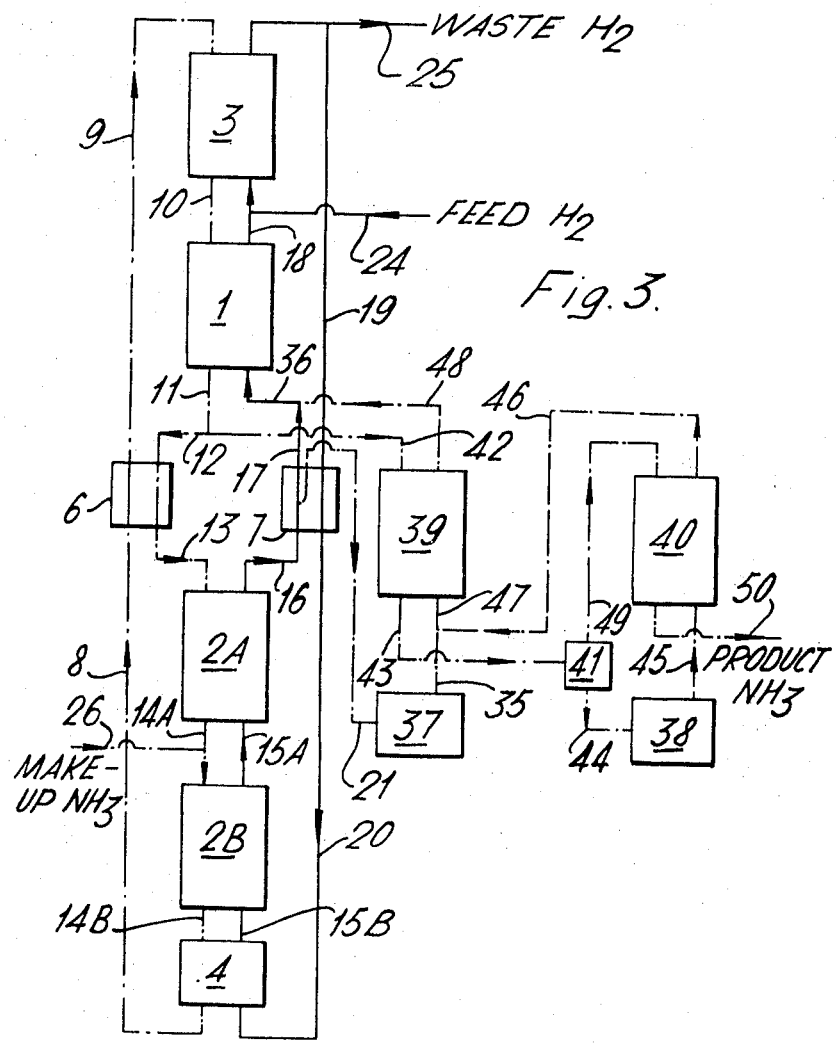
FIGURE 3 is a flowsheet for a process in which the condensed ammonia is cracked and passed in countercurrent flow to a bleed flow of enriched ammonia.

In the drawings, the continuous flow lines indicate the gaseous hydrogen flow, the chain flow lines, liquid ammonia and in FIGURES 2 and 3, the double chain lines, cracked ammonia.

Figure 1:
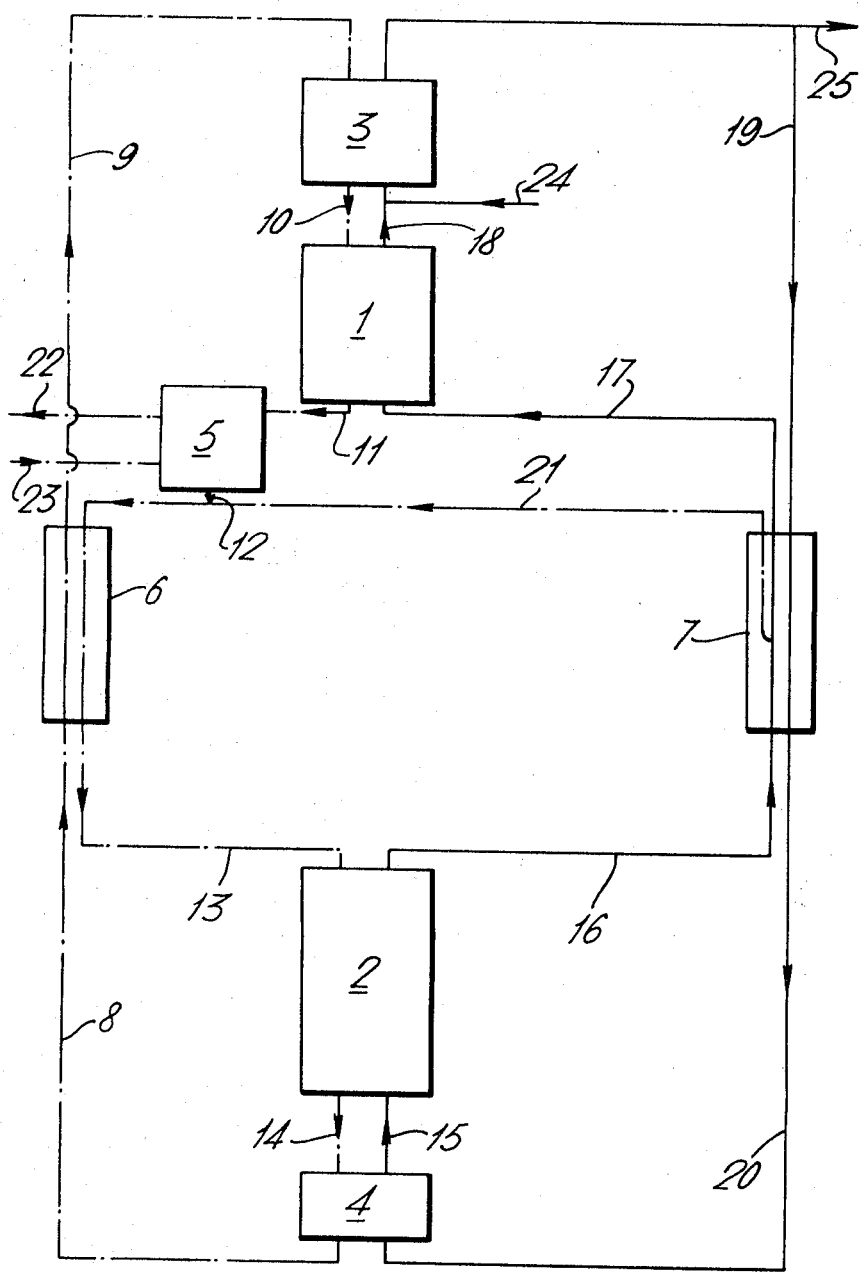
FIGURE 1 is a flowsheet for a known process in which the condensed ammonia is recirculated.

Referring to FIGURE 1, the apparatus comprises a cold stripper tower 1, a hot tower 2, a cold feed tower 3, a humidifier 4, a product removal plant 5 and two heat exchangers 6 and 7. The cold towers 1 and 3 are maintained at a temperature of −70° C. and the hot tower 2 and humidifier 4 at a temperature of 20° C. The pressure within the system is 240 atmospheres.

A stream of liquid ammonia solution containing potassamide catalyst in a concentration of about 35 gms./litre of solution and also containing pyrrolidine in a proportion of about 16% by weight of the solution is recycled from the humidifier 4, through a conduit 8 to the heat exchanger 6 and on through a further conduit 9 to the cold feed tower 3. A conduit 10 carries the ammonia stream from tower 3 to tower 1 and from the cold stripper tower 1, the ammonia passes through further conduits 11, 12, 13 and 14 which lead it in turn to the product removal plant 5, the heat exchanger 6, the hot tower 2 and the humidifier 4.

A stream of gaseous hydrogen is passed through the apparatus in the opposite direction to the liquid ammonia solution. The hydrogen thus passes from the humidifier 4 to the hot tower 2 through a conduit 15, and thence through a series of conduits 16, 17, 18, 19 and 20 which lead in turn to the heat exchanger 7, cold stripper tower 1, cold feed tower 3, heat exchanger 7 and back to the humidifier 4. A further conduit 21 passes from the heat exchanger 7 to connect with the conduit 12 leaving the product removal plant 5.

The product removal plant is provided with a product off-take conduit 22 and a make-up conduit 23. A feed conduit 24 connects with the conduit 18 and a waste conduit 25 leads off from the conduit 19. The conduits 24 and 25 may conveniently be arranged to pass in heat exchange relationship with each other.

In operation depleted hydrogen from conduit 20 is bubbled through depleted ammonia solution in the humidifier 4 as a result of which the hydrogen is saturated with ammonia vapour at 20° C. The saturated hydrogen is then passed into the hot tower 2 in which deuterium passes from the ammonia to the hydrogen, whereby an enriched hydrogen stream passes through conduit 16 to the heat exchanger 7 in which the gas stream is cooled to the temperature of the cold stripper tower 1. This cooling causes the condensation of most of the ammonia vapour in the hydrogen stream and the ammonia condensate is passed through the conduit 21 to be mixed with ammonia solution leaving a product removal plant 5 through the conduit 12. The removal of the ammonia vapour from the hydrogen gas stream causes partial deuterium depletion of the gas stream since the deuterium concentration of the ammonia condensate is greater than that of the hydrogen. In spite of this partial depletion however the deuterium concentration in the hydrogen stream is several times the natural concentration.

The cooled hydrogen stream from the heat exchanger 7 is passed through conduit 17 to the cold stripper tower 1 in which deuterium passes from the hydrogen to the ammonia solution. The number of theoretical plates in the tower 1 is such that the deuterium concentration in the hydrogen stream leaving the tower 1 through the conduit 18 is the natural concentration. Additional hydrogen of natural concentration from feed conduit 24 is introduced into the hydrogen in conduit 18 and the two hydrogen streams are passed into the cold feed tower 3 in which the hydrogen is further depleted.

The depleted hydrogen is then passed through conduit 19 to heat exchanger 7 in which the hydrogen is warmed to the temperature of the humidifier 4 to which it passes through the conduit 20, a quantity of waste (depleted) hydrogen equal to that added through the feed conduit 24 being withdrawn through the waste conduit 25.

Depleted ammonia solution, after being contacted with hydrogen in the humidifier 4, is passed through conduit 8 to the heat exchanger 6 in which it is cooled to the temperature of the cold feed tower 3 to which it is passed through conduit 9. The ammonia stream is partially enriched in the tower 3 and then passed through conduit 10 to the tower 1 in which it is further enriched.

Enriched ammonia solution is passed through conduit 11 to the product removal plant 5 in which part of the ammonia solution is removed and treated further to give further enrichment and a final product of deuterium oxide which may be removed through the off-take conduit 22. Sufficient ammonia is introduced into the plant 5, by the make-up conduit 23 to replace the ammonia removed for further treatment, this resulting in a slight depletion in the ammonia stream due to the different deuterium contents of the ammonia streams removed and added.

Ammonia from plant 5 is passed into conduit 12 into which the ammonia condensate from heat exchanger 7 is introduced by means of conduit 21. A further slight depletion occurs but the deuterium concentration of the mixed streams is still considerably in excess of natural. The mixed streams are passed into the heat exchanger 6 in which they are warmed to the temperature of the hot tower 2 to which they are passed by conduit 13. Deuterium passes from the ammonia to the hydrogen in the hot tower 2 and the ammonia stream passing to the humidifier 4 by the conduit 14 has a deuterium content of less than natural. In the humidifier 4 the amount of ammonia is reduced due to the evaporation of part of the ammonia stream to form the ammonia vapour contained in the hydrogen stream. Little isotopic exchange occurs in the humidifier but an effective increase in the deuterium content of the gas stream occurs as a result of the introduction of the ammonia vapour into the hydrogen, such ammonia vapour being less depleted than the hydrogen gas.

Although heat exchanges 6 and 7 will produce the major proportion of heating or cooling of the streams flowing through them, it will be appreciated that the effect of these heat exchanges will have to be supplemented by suitable heating or cooling means as required.

Using the apparatus described in relation to FIGURE 1 as part of a plant designed to produce 24 tons/year of heavy water, the flow rates in the more important conduits would be as indicated hereafter in Table I.

TABLE I

| Conduit: | Stream | Flow Rate (lb. moles/hr.) | Deuterium Content |
| --- | --- | --- | --- |
| 8 and 9 | $NH_3$ | 594 | 0.468 |
| 10 | $NH_3$ | 594 | 6.650 |
| 11 | $NH_3$ | 594 | 25.000 |
| 12 | $NH_3$ | 594 | 22.404 |
| 13 | $NH_3$ | 847 | 22.304 |
| 14 | $NH_3$ | 847 | 0.468 |
| 15 | $H_2$ | 3,543 | 0.136 |
| 16 | $H_2$ | 3,543 | 7.197 |
| 17 | $H_2$ | 3,543 | 5.606 |
| 18 | $H_2$ | 3,543 | 1.000 |
| 19 and 20 | $H_2$ | 3,543 | 0.100 |
| 21 | $NH_3$ | 253 | 22.068 |
| 24 | $H_2$ | 2,566 | 0.100 |
| 25 | $H_2$ | 2,566 | 0.100 |

The flow rates for hydrogen are quoted ignoring the quantities of ammonia vapour saturating the streams but the deuterium contents are given for the whole gas stream and thus include the effect of the ammonia vapour. In general the concentration of ammonia vapour in the gas stream is insignificant except in the gas stream flowing from the humidifier 4, through conduit 15, hot tower 2 and conduit 16 to the heat exchanger 7, in which there is an ammonia vapour content of 253 lb. moles/hour, which is sufficient to cause saturation of the hydrogen gas and the removal of which from the gas stream leads to an effective reduction in the deuterium content of the gas stream from 7.1966 to 5.6060.

The deuterium contents are expressed as $$\frac{[D]}{[D+H]} \bigg/ \frac{[D]}{[D+H]} \text{nat}$$

where [D] is the deuterium content of the substance: [D+H] is the total content of hydrogen plus deuterium; [D] nat is the natural deuterium content: and [D+H] nat is the total natural content by hydrogen plus deuterium. Thus, the deuterium content is effectively expressed as a multiple of the natural deuterium content of the material. Expressing deuterium contents in this manner, a substance containing 100% of deuterium would have a deuterium content of 6898.

It will be noted that the deuterium content of the ammonia stream passing into the product removal plant 5 is 25 which is considerably short of the required deuterium content. This stream may be subjected to a further dual temperature exchange process to give an ammonia product stream having a deuterium content of about 1,000, which may be subjected to distillation to give a further concentration of the deuterium isotope, the enriched ammonia product from the distillation then being cracked and burned to give heavy water, the final product of the plant.

FIGURE 2 shows a flowsheet for the dual temperature ammonia-hydrogen exchange process, modified in accordance with the present invention. Corresponding parts are identified as in FIGURE 1.

The hot tower 2 is divided into two portions, 2A and 2B. In section 2A, the ammonia stream is depleted to natural deuterium content and passes to section 2B through a conduit 14A. A stream of ammonia, equal in quantity to that condensed from the hydrogen gas stream in heat exchanger 7 is introduced into the conduit 14A through a feed circuit 26. In section 2B the ammonia is depleted further and is then passed through a conduit 14B to the humidifier 4. The rest of the ammonia circuit is similar to that described with reference to FIGURE 1 except that there is no connection between the conduit 12 and the heat exchanger 7 whereby ammonia condensate passes along circuit 21 from heat exchanger 7 to conduit 12.

The major modification to the flowsheet and apparatus is to be found in the hydrogen gas circuit, and more particularly in that part of the circuit through which the ammonia condensate from heat exchanger 7 is passed. The conduit 21 leads into an expansion chamber 27 from which a conduit 28 leads to a heat exchanger 29 from which a further conduit 30 passes to an ammonia "cracker" 31. A conduit 32 passes from the ammonia "cracker" 31 to a compression chamber 33 to which is also connected a conduit 34 which leads to the heat exchanger 29 from which it passes as a further conduit 35. The conduit 35 connects with the conduit 17 to form conduit 36 which enters the cold stripper tower 1.

The expansion chamber 27 and compression chamber 33 may be mechanically linked to minimise energy losses in the expansion and compression processes.

In operation, the ammonia condensate is passed through conduit 21 to the expansion chamber 27 in which the pressure is reduced from 240 atmospheres to about two atmospheres. The decompressed liquid ammonia is then passed to the heat exchanger 29 via the conduit 28. In heat exchanger 29 the ammonia is raised to a temperature in the range 600–1,000° C., which results in vaporisation of the ammonia in the heat exchanger. The gaseous ammonia is then passed through the conduit 29 into the ammonia "cracker" 31. The ammonia "cracker" 31 is maintained at a temperature in the range 600–1,000° C., and contains a catalysts, such as, for example, an ammonia synthesis catalyst or a supported nickel oxide catalyst. This treatment results in practically complete decomposition of the ammonia to cracked ammonia in accordance with the equation:

$$2NH_3 \rightarrow N_2 + 3H_2$$

The cracked ammonia plus the remaining uncracked ammonia is passed through the conduit 32 to the compression chamber 33 in which the gases are compressed to 240 atmospheres. The compressed gases are then passed to the heat exchanger 29 in which they are cooled to the temperature of the cold towers. Any ammonia present in excess of that required to satuate the gas stream at this low temperature will be condensed and may be rejected as waste but will preferably be recirculated through a conduit (not shown) leading to the conduit 21. The cold cracked ammonia is then passed through the conduit 35 to mix with the cold hydrogen in the conduit 17, the gases then being passed into the cold stripper tower 1 through the conduit 36.

This arrangement thus restores to the hydrogen gas, as cracked ammonia, the deuterium content which was removed from the hydrogen, as ammonia condensate, in the heat exchanger 7. The immediate result of this is that in the system set out in Table I, the deuterium content of the gas stream entering the cold tower 1 would become 7.1966 instead of 5.6060. This increase in the deuterium content of the gas stream will cause other changes in the deuterium contents and flow rates of the streams in the circuit to occur. However, applying ammonia cracking to the system set out in Table I, when equilibrium has been attained within the system, the major improvement will be that the deuterium content of the gas stream entering the cold tower is greater than that of the hydrogen stream entering the cold tower in the system of Table I, and the ammonia stream leaving the tower 1 will correspondingly be more enriched, to a deuterium content of about 30.

However, the effect of ammonia cracking may be used in other ways to permit a reduction in the size of either the cold or hot towers.

The apparatus described in relation in FIGURE 2 may form part of a plant designed to produce 24 tons/year, and in such a plant the flow rates in the more important conduits would be as set forth in Table II.

TABLE II

| Conduit: | Stream | Flow Rate (lb. moles/hr.) | Deuterium Content |
|---|---|---|---|
| 8 and 9 | NH₃ | 598 | 0.477 |
| 10 | NH₃ | 598 | 6.650 |
| 11 | NH₃ | 598 | 25.000 |
| 12 and 13 | NH₃ | 598 | 22.422 |
| 14A | NH₃ | 598 | 1.000 |
| 14B | NH₃ | 864 | 0.477 |
| 15B | H₂ | 3,543 | 0.138 |
| 15A | H₂ | 3,543 | 0.310 |
| 16 | H₂ | 3,543 | 5.170 |
| 17 | H₂ | 3,543 | 3.393 |
| 18 | H₂ | 3,942 | 1.000 |
| 19 and 20 | H₂ | 3,543 | 0.100 |
| 21 | NH₃ | 266 | 20.974 |
| 24 | H₂ | 2,167 | 1.000 |
| 25 | H₂ | 2,566 | 0.100 |
| 26 | NH₃ | 266 | 1.000 |
| 35 | N₂+H₂ | 399 | 22.974 |
| 36 | H₂ | 3,942 | 5.170 |

Comparing Tables I and II; it will be observed that the major change is that although the ammonia streams in conduit 11 have the same deuterium content, the deuterium content of the hydrogen stream in conduit 17 (Table I) is greater than that of the hydrogen stream in conduit 36 (Table II), both of these conduits being directly connected to the cold stripper tower 1. It will also be observed however that the quantity of hydrogen in the latter case is greater due to the addition of the cracked ammonia. It will also be noted that the effective deuterium content in the hydrogen in conduit 16 (Table II) is much less than that of the hydrogen in the same conduit in the Table I system, and it will be appreciated that this lower deuterium content permits smaller hot towers to be used in the Table II system.

Table III sets out the size of the various towers in the two systems.

TABLE III

| | Number of Theoretical Plates | |
|---|---|---|
| | Recycle | Cracking |
| Tower: | | |
| 3 | 7.6 | 7.6 |
| 1 | 3.4 | 3.6 |
| 2A | 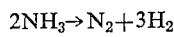 54.1 | 10.3 |
| 2B | | 6.4 |

"Recycle" refers to the FIGURE 1 apparatus and "Cracking" to the FIGURE 2 apparatus. It will be observed that the cold towers in both types of apparatus are essentially the same size, but that the size of the hot towers is much less in the apparatus of FIGURE 2, the reduction in size being about 70%. This reduction in size of the hot towers may be partially offset by the cost of the ammonia cracking circuit. However, the quantity of ammonia being treated in the ammonia cracking circuit is only 266 lb. moles/hour in the present case and thus the cost of the ammonia cracking circuit will be relatively small. The net result will therefore be that the same enriched ammonia product is obtained using plant of reduced cost compared with the apparatus of FIGURE 1.

In Table II, as in Table I, the hydrogen flow rates do not include the quantity of ammonia saturating the gas stream but the effect of the ammonia on the effective deuterium content of the hydrogen is included.

The cracked ammonia in conduit 35 is indicated as a mixture of nitrogen and hydrogen, but it will be appreciated that all the circulating hydrogen gas streams will include a small equilibrium proportion of nitrogen, of about 5 moles percent.

In FIGURE 3, corresponding parts are indicated by the same reference numerals as used in FIGURES 1 and 2.

Conduit 21 passes from the heat exchanger 7 to an ammonia cracking circuit 37. The ammonia cracking circuit 37 will be similar to that shown in detail in FIGURE 2 as including expansion chamber 27, heat exchanger 29, ammonia cracker 31 and compression chamber 33. In addition to the cracking circuit 37, the apparatus additionally includes a second cracking circuit 38, second and third cold stripper towers 39 and 40 and an ammonia evaporator 41.

A bleed conduit 42 leads from the junction of conduits 11 and 12 to the cold tower 39 and a further conduit 43 passes from the tower 39 to the evaporator 41. From evaporator 41, a conduit 44 leads to the cracker 38, from whence a conduit 45 passes to the cold tower 40, a return conduit 46 passing from the tower 40 to join conduit 35 to form a conduit 47 which passes into the tower 39. A conduit 48 passes from the tower 39 and links with the conduit 17 to give conduit 36. From the evaporator 41, a second conduit 49 passes directly to the tower 40 and a product ammonia conduit 50 leads out of the tower 40. The towers 39 and 40 are provided with suitable means to maintain them at a temperature of −70° C.

The main part of the apparatus will be operated in the manner described in relation to FIGURE 1. The apparatus differs from that described in relation to FIGURE 2 in the section for the treatment of the condensed, catalyst free, ammonia passing from the heat exchanger 7.

In use. the ammonia is passed through conduit 21 to the cracking circuit 37, in which it is treated to give cracked ammonia in the manner previously described.

A small proportion of the cold enriched ammonia solution in conduit 11 is withdrawn through bleed conduit 42 and passed to the cold tower 39 in which it is enriched still further by isotopic exchange with the cracked ammonia which passes into the tower 39 from the conduit 47. The cracked ammonia leaves the tower 39 through conduit 48 and is passed to mix with the hydrogen stream in conduit 36. It should be noted that although the deuterium content of the cracked ammonia is reduced by its passage through the tower 39, the relative flows of ammonia and cracked ammonia passing through the tower 39 are such that the cracked ammonia in conduit 48 has a deuterium content in excess of natural.

The ammonia from tower 39 passes through conduit 43 to the evaporator 41. In the evaporator 41, the ammonia stream is split into two unequal portions and the major portion is evaporated to give an enriched ammonia vapour and leaving a deuterium enriched catalyst, some of which may be removed and reintroduced into the main system at an appropriate point, for example, in conduit 11. The ammonia vapour is passed through conduit 44 to cracker 38 which operates in a similar fashion to cracker 37 although it will be appreciated that the initial decompression and heating of the ammonia stream will, in this case, have been effected, at least in part, in the evaporator 41.

A minor portion of the ammonia solution passes from evaporator 41, through conduit 49 to cold tower 40, in which it flows in isotopic exchange relationship with the cracked ammonia introduced from cracker 38 by the conduit 45. A highly enriched ammonia solution is withdrawn as product through the conduit 50, whilst cracked ammonia, which is still quite highly enriched, passes through conduit 46 is mixed with cracked ammonia from cracking circuit 37, in the conduit 35, and passes through conduit 47 into the tower 39.

It will be appreciated that the enrichment of the product may be varied by changing the flow rates in the conduits and the operating temperatures of the hot and cold towers. The enriched hydrogen gas stream in conduit 16 is saturated with ammonia vapour, and removal of this ammonia vapour from the hydrogen results in an effective decrease in the enrichment of the hydrogen, which is in part compensated for by the cracked ammonia introduced into conduit 36 by the conduit 48.

If the apparatus described was used as part of a plant to produce 24 tons/year of heavy water, the flow rates in the various conduits would be as indicated in the Table IV.

TABLE IV

| Conduit | Stream | Equivalent Hydrogen flow rate (lb. moles/hr.) | Deuterium Concentration | Total Deuterium |
|---|---|---|---|---|
| 8 and 9 | NH₃ | 897 | 0.477 | 428 |
| 10 | NH₃ | 897 | 6.650 | 5,948 |
| 11 | NH₃ | 897 | 22.798 | 20,450 |
| 12 and 13 | NH₃ | 880 | 22.798 | 20,062 |
| 14A | NH₃ | 880 | 1.000 | 880 |
| 14B | NH₃ | 1,296 | 0.477 | 618 |
| 15B | H₂ | 3,947 | 0.138 | 545 |
| 15A | H₂ | 3,947 | 0.310 | 1,224 |
| 16 | H₂ | 3,947 | 5.170 | 20,406 |
| 17 | H₂ | 3,548 | 3.359 | 11,918 |
| 18 | H₂ | 3,962 | 1.000 | 3,962 |
| 19 and 20 | H₂ | 3,548 | 0.100 | 355 |
| 21 | NH₃ | 399 | 21.272 | 8,488 |
| 24 | H₂ | 2,172 | 1.000 | 2,172 |
| 25 | H₂ | 2,585 | 0.100 | 258 |
| 26 | NH₃ | 416 | 1.000 | 416 |
| 35 | H₂+H₂ | 399 | 21.272 | 8,488 |
| 36 | H₂ | 3,962 | 4.660 | 18,464 |
| 42 | NH₃ | 17 | 22.798 | 388 |
| 43 | NH₃ | 17 | 156.058 | 2,653 |
| 44 | NH₃ | 14.670 | 156.058 | 2,289 |
| 45 | H₂+N₂ | 14.670 | 156.058 | 2,289 |
| 46 | H₂+N₂ | 14.670 | 22.018 | 323 |
| 47 | H₂+N₂ | 414 | 21.272 | 8,811 |
| 48 | H₂+N₂ | 414 | 15.812 | 6,546 |
| 49 | NH₃ | 2.330 | 156.058 | 364 |
| 50 | NH₃ | 2.330 | 1,000 | 2,330 |

In Table IV, the ammonia flow rates are given in terms of the equivalent hydrogen flow rate which is 3/2 times the actual ammonia flow rate in lb. moles/hr. The total deuterium is the product of equivalent hydrogen flow rate and deuterium concentration. The figures quoted for conduits containing hydrogen or hydrogen/nitrogen mixtures include the effect of the ammonia vapour in both the flow rate and the deuterium contents. As in Table II, the cracked ammonia streams are indicated as a mixture of nitrogen and hydrogen.

The effect of adding the cracked ammonia to the hydrogen stream in the conduit 17 is to increase the deuterium content of the hydrogen entering the cold tower 1 relative to that of the hydrogen leaving the heat exchanger 7 (compare 17 and 36). As in the arrangement described with reference to FIGURE 2 this increased deuterium content may be put to use in several possible ways and in the present case the size of the cold towers has been retained, whilst the hot towers are considerably reduced in size since the hydrogen is not enriched to the same degree in the hot towers.

Reducing the size of the hot towers as in the systems set out in Tables II and IV results in a reduction in the capital cost of the dual temperature exchange section of the plant and the reduction in cost may be of the order of 20%. The cost of equipment for the further enrichment using the system of Table IV is also considerably reduced compared with using a further dual temperature system for the further enrichment. The saving in this case is however partially offset by the cost of the ammonia crackers.

The flow rates, etc., quoted in Tables II and IV were not optimised for the systems shown in FIGURES 2 and 3 but were in fact obtained from the optimised flow rates for a conventional dual temperature process as shown in FIGURE 1, using a second dual temperature system for the further enrichment step, by adjusting these flow rates to allow for the effect of cracking the ammonia and recycling the cracked ammonia. It will be appreciated that with flow rates optimised for the systems disclosed, the cost of the plant could be reduced by a greater amount than is possible using the flow rates quoted herein and thus use of the present invention offers considerable economies compared to the dual temperature exchange apparatus and techniques used hitherto.

I claim:

1. In a process for the production of deuterium enriched materials by a dual temperature ammonia-hydrogen isotope exchange process in which a stream of hydrogen gas from a hot tower is cooled to the temperature of a cold tower prior to being passed to the cold tower, whereby ammonia vapour contained in said hydrogen stream is condensed, the improvement which comprises cracking the condensed ammonia to provide a mixture of hydrogen and nitrogen, cooling the mixture, and passing the cooled mixture in isotope exchange relationship with a stream of liquid ammonia in the cold exchange tower of the dual temperature system.

2. The process of claim 1 wherein a small bleed flow is taken from an enriched cold ammonia stream passing from the cold tower of the dual temperature system, such bleed flow is passed to a further cold tower, the cracked ammonia is passed from the cracking process to the further cold tower and the two streams are passed in isotope exchange relationship through the further cold tower whereby the bleed flow is further enriched.

monia stream is passed from the further cold tower, mixed with the cold hydrogen stream and the mixed streams are passed into the cold tower of the dual temperature system.

4. The process of claim 2 wherein a major part of the further enriched bleed is separated and cracked and such cracked major part of the bleed is passed to a third cold tower, the minor uncracked part of the bleed is passed to the third cold tower, the two streams are passed in isotope exchange relationship through the third cold tower and a highly enriched ammonia stream is withdrawn as a product.

5. The process of claim 1 wherein the liquid ammonia stream comprises a solution of potassamide and pyrrolidine in liquid ammonia.

6. In a dual temperature ammonia-hydrogen isotope exchange apparatus comprising a first isotope exchange tower provided with means to operate at a low temperature, a second isotope exchange tower provided with means to operate at a higher temperature than said first tower, a first conduit from said first tower to said second tower, heating means for said first conduit, a second conduit from said second tower to said first tower and cooling means for said second conduit, the improvement comprising an ammonia cracking means, a condensate conduit from said cooling means to the ammonia cracking means, a cracked ammonia outlet means for said ammonia cracking means and means connecting said cracked ammonia outlet means to the second conduit at a point between the cooling means and the first tower.

7. The apparatus of claim 6 wherein the means connecting the cracked ammonia outlet means to the second conduit comprises a third isotope exchange tower and third and fourth conduits connecting said third tower to the cracked ammonia outlet means and the second conduit respectively.

8. The apparatus of claim 7 wherein a bleed conduit is connected to the third exchange tower and to the first conduit at a point between the first tower and the heating means.

9. The apparatus of claim 8 wherein a further bleed conduit is connected to the third tower and to a finishing plant.

10. The apparatus of claim 9 wherein said finishing plant comprises a liquid flow separating means, means to pass a major part of a bleed flow from said separating means to an ammonia evaporator, means connecting said ammonia evaporator to a further ammonia cracking means, means connecting said further ammonia cracking means to a fourth exchange tower, means to pass a minor part of a bleed flow from said separating means to the fourth exchange tower and means to withdraw a highly enriched liquid ammonia product from said fourth exchange tower.

References Cited

UNITED STATES PATENTS 3,233,971   2/1966   Delassus et al. _____ 23—193

FOREIGN PATENTS 896,269   5/1962   Great Britain.

EARL C. THOMAS, Primary Examiner.

HOKE S. MILLER, Assistant Examiner.

U.S. Cl. X.R.

23—210, 288